US008218833B2

(12) United States Patent  
Iwamoto

(10) Patent No.: US 8,218,833 B2  
(45) Date of Patent: Jul. 10, 2012

(54) IMAGE CAPTURING APPARATUS, METHOD OF DETERMINING PRESENCE OR ABSENCE OF IMAGE AREA, AND RECORDING MEDIUM

(75) Inventor: Kenji Iwamoto, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 497 days.

(21) Appl. No.: 12/554,195

(22) Filed: Sep. 4, 2009

(65) Prior Publication Data

US 2010/0091135 A1   Apr. 15, 2010

(30) Foreign Application Priority Data

Sep. 9, 2008 (JP) ................................ 2008-231203

(51) Int. Cl.
 *G06K 9/00* (2006.01)
 *H04N 5/228* (2006.01)
(52) U.S. Cl. ...................................... 382/118; 348/222.1
(58) Field of Classification Search .................. 382/115, 382/118, 191, 190, 209, 224; 348/143, 151, 348/152–156, 159, 161, 207.99, 222.1
 See application file for complete search history.

(56) References Cited

U.S. PATENT DOCUMENTS

| 7,747,157 | B2 | 6/2010 | Sugimoto | |
|---|---|---|---|---|
| 8,063,943 | B2* | 11/2011 | Yi et al. | 348/222.1 |
| 2007/0122034 | A1* | 5/2007 | Maor | 382/181 |
| 2008/0008361 | A1* | 1/2008 | Nozaki et al. | 382/118 |
| 2008/0050022 | A1 | 2/2008 | Okada et al. | |
| 2008/0080748 | A1* | 4/2008 | Sukegawa et al. | 382/118 |
| 2009/0232363 | A1* | 9/2009 | Ohashi et al. | 382/118 |
| 2010/0091105 | A1* | 4/2010 | Watanabe | 348/140 |
| 2010/0141786 | A1* | 6/2010 | Bigioi et al. | 348/222.1 |
| 2011/0228136 | A1* | 9/2011 | Sugimoto | 348/231.99 |

FOREIGN PATENT DOCUMENTS

| JP | 2007-082026 A | 3/2007 |
|---|---|---|
| JP | 2008-028960 A | 2/2008 |
| JP | 2008-040710 A | 2/2008 |
| JP | 2008-042319 A | 2/2008 |

OTHER PUBLICATIONS

Japanese Office Action dated Nov. 2, 2010 (and English translation thereof) in counterpart Japanese Application No. 2008-231203.

* cited by examiner

*Primary Examiner* — Timothy J Henn

(74) *Attorney, Agent, or Firm* — Holtz, Holtz, Goodman & Chick, PC

(57) ABSTRACT

A detecting unit detects any image area corresponding to a subject from the first image which is reduced resolution of an image that captured by an image capturing unit. With no image area detected as corresponding to the subject, a first control unit deems that an image area corresponding to the subject is absent in the image that captured by the image capturing unit. On the other hand, when the detecting unit detects an image area corresponding to the subject, a first determining unit determines whether or not the image area that detected by the detecting unit is an image area corresponding to the subject. If the area is determined to correspond to the subject, a second control unit deems that an image area corresponding to the subject is present in the image that captured by the image capturing unit.

14 Claims, 13 Drawing Sheets

100

P30

P31

P32

IMAGE CAPTURING APPARATUS, METHOD OF DETERMINING PRESENCE OR ABSENCE OF IMAGE AREA, AND RECORDING MEDIUM

BACKGROUND OF THE INVENTION

1. Field of the Invention

The present invention relates to an image capturing apparatus, a method of determining presence or absence of an image area, and a recording medium.

2. Description of the Related Art

Some digital cameras are equipped with a device that detects a face from an image formed on an image pickup device, for controlling camera exposure based on the face of the capture subject person. For example, Patent Literature 1 (Unexamined Japanese Patent Application KOKAI Publication No. 2008-28960) discloses an image capturing apparatus and image capture method that take quickness above accuracy in detecting a face from a live view image and control camera exposure to suit to the face detected in this way. Patent Literature 2 (Unexamined Japanese Patent Application KOKAI Publication No. 2008-42319) discloses an image pickup apparatus and an image capture method that take accuracy above quickness in detecting a face from a full-size image and compute evaluation on the expression on the face detected in this way.

SUMMARY OF THE INVENTION

The present invention was made in view of this background art, and an object of the present invention is to accurately determine presence or absence of an image area that corresponds to a subject while shortening the time taken for the determination.

To achieve the above object, an aspect of the present invention is an image capturing apparatus that includes:

an image capturing unit that captures an image by an image capture process;

an image generating unit that generates a first image, which reduced resolution of the image that captured by the image capturing unit;

a detecting unit that detects any image area corresponding to a subject from the first image generated by the image generating unit:

a first control unit that, in a case where the detecting unit detects no image area corresponding to the subject from the first image, deems that an image area corresponding to the subject is absent in the image that captured by the image capturing unit;

a first determining unit that, in a case where the detecting unit detects the image area from the first image, determines whether or not the image area that detected by the detecting unit is an image area corresponding to the subject; and a second control unit that, in a case where the first determining unit determines that the image area is an image area corresponding to the subject, deems that an image area corresponding to the subject is present in the image that captured by the image capturing unit.

To achieve the above object, another aspect of the present invention is a method of determining presence or absence of an image area including:

an image generating step of generating a first image, which reduced resolution of an image that captured by an image capturing unit;

a detecting step of detecting any image area corresponding to a subject from the first image generated by the image generating step;

a first controlling step of, in a case where the detecting step detects no image area from the first image corresponding to the subject, deems that an image area corresponding to the subject is absent in the image that captured by the image capturing unit;

a first determining step of, in a case where the detecting step detects the image area from the first image, determines whether or not the image area that detected by the detecting step is an image area corresponding to the subject; and a second controlling step of, in a case where the first determining step determines that the image area is an image area corresponding to the subject, deems that an image area corresponding to the subject is present in the image that captured by the image capturing unit.

To achieve the above object, still another aspect of the present invention is a recording medium storing a program that controls a computer possessed by an image capturing apparatus to function as:

an image generating unit that generates a first image, which reduced resolution of an image that captured by an image capturing unit;

a detecting unit that detects any image area corresponding to a subject from the first image generated by the image generating unit;

a first control unit that, in a case where the detecting unit detects no image area from the first image corresponding to the subject, deems that an image area corresponding to the subject is absent in the image that captured by the image capturing unit;

a first determining unit that, in a case where the detecting unit detects the image area from the first image, determines whether or not the image area that detected by the detecting unit is an image area corresponding to the subject; and a second control unit that, in a case where the first determining unit determines that the image area is an image area corresponding to the subject, deems that an image area corresponding to the subject is present in the image that captured by the image capturing unit.

BRIEF DESCRIPTION OF THE DRAWINGS

These objects and other objects and advantages of the present invention will become more apparent upon reading of the following detailed description and the accompanying drawings in which.

DETAILED DESCRIPTION OF TUB PREFERRED EMBODIMENT

With reference to the drawings, an explanation will now be given to an embodiment, which is an example wherein the image capturing apparatus according to the present invention is applied to a digital camera.

Embodiment

A. Configuration of Digital Camera

Figure 1:
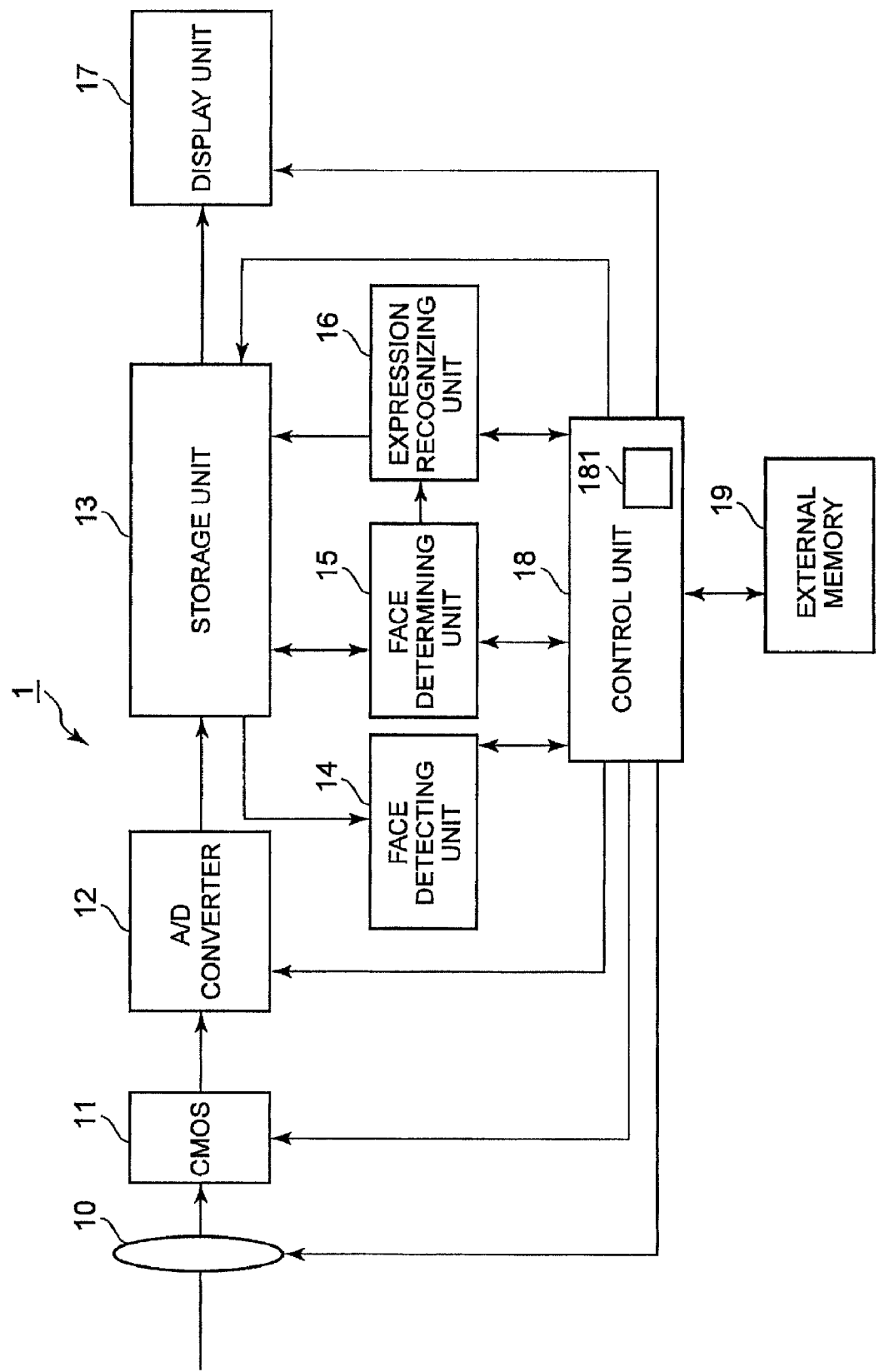
FIG. 1 is a diagram showing a conceptual configuration of a digital camera which is one embodiment of the present invention.

FIG. 1 is a diagram showing a conceptual configuration of a digital camera 1 according to the present embodiment. As shown in FIG. 1, the digital camera 1 includes an optical lens device 10, a CMOS 11, an A/D converter 12, a storage unit 13, a face detecting unit 14, a face determining unit 15, an expression recognizing unit 16, a display unit 17, a control unit 18, and an external memory 19.

The optical lens device 10 includes a lens, a diaphragm, a focusing device, a shutter device, etc., and forms an image of a subject on the CMOS 11.

The CMOS 11 comprises a two-dimensional matrix array of approximately a million image detecting elements, and converts an image formed on the array by the optical lens device 10 into an image signal. An image signal output by the CMOS 11 has a pixel count that is substantially equal to the number of image detecting elements on the CMOS 11. An image (signal) that has a pixel count substantially equal to the number of image detecting elements on the CMOS 11 will be referred to as full-size image (signal). As will be described later, the resolution available on the display unit 17 is lower than a full-size image. Furthermore, a live view image needs to be refreshed smoothly. Hence, an image signal that is output by the CMOS 11, and as will be described later, converted into a digital signal by the A/D converter 12 and temporarily stored in the storage unit 13 is reduced in pixel count by the control unit 18, which thus generates and outputs an image having a resulting reduced resolution of, for example, VGA class. An image (signal) with this reduced resolution will hereinafter be referred to as live view image (signal).

The A/D converter 12 is a circuit that converts an analog signal into a digital signal, and converts an image signal output by the CMOS 11 into a digital signal.

The storage unit 13 is a storage device that stores an image signal.

The face detecting unit 14 detects, as an image area in which a subject is present, an image area that has a possibility of representing an image (facial image) that includes a human face (such an image area will hereinafter be referred to as a facial image area) from a live view image in accordance with an instruction from the control unit 18.

The face determining unit 15 determines whether an area in a full-size image that corresponds to a facial image area detected by the face detecting unit 14 represents a facial image or not in accordance with an instruction from the control unit 18.

The expression recognizing unit 16 computes an expression evaluation score that indicates whether the face included in an extracted facial image is similar or not to a specific expression in accordance with an instruction from the control unit 18.

The display unit 17 is a liquid crystal display device that displays a live view image, etc. in accordance with an instruction from the control unit 18.

The control unit 18 is a computer that controls the operation of the digital camera 1, and in accordance with a program written on a program memory 181, controls the face detecting unit 14, etc. to perform a process, described later, of determining presence or absence of a facial image in an image signal output by the CMOS 11.

The external memory 19 is constituted by, for example, a memory card detachable to the digital camera body, a flash memory built in the camera body, or the like.

The digital camera 1 having the configuration described above converts a subject image picked up by the optical lens device 10 into an electric signal via the CMOS 11, and converts the electric signal via the A/D converter 12 into a digital signal and stores it in the storage unit 13. A subject image picked up by the optical lens device 10 is displayed on the display unit 17 at a reduced resolution. A user views the image displayed on the display unit 17, and can store only a desired image frame in the external memory 19 by operating the shutter device unillustrated.

As described above, the display unit 17 can display only a limited pixel count. Hence, the control unit 18 generates a live view image with a smaller pixel count separately from a full-size image output by the CMOS 11, by reducing the pixel count of the full-size image, and outputs the generated live view image into the storage unit 13.

As described above, the digital camera 1 captures an image at an instant a user gives a manual operation to its shutter device while he/she is viewing the image displayed on the display unit 17. On the other hand, the digital camera 1 can also automatically capture an image when it detects an instant the subject person turns to a favorable expression (hereinafter, this capability will be referred to as auto-shutter). For example, when the user selects auto-shutter at the moment a live view image as shown in FIG. 2 is displayed on the display unit 17, the digital camera 1, performs the following process.

Figure 2:
FIG. 2 is a diagram showing a live view image.
Figure 3:
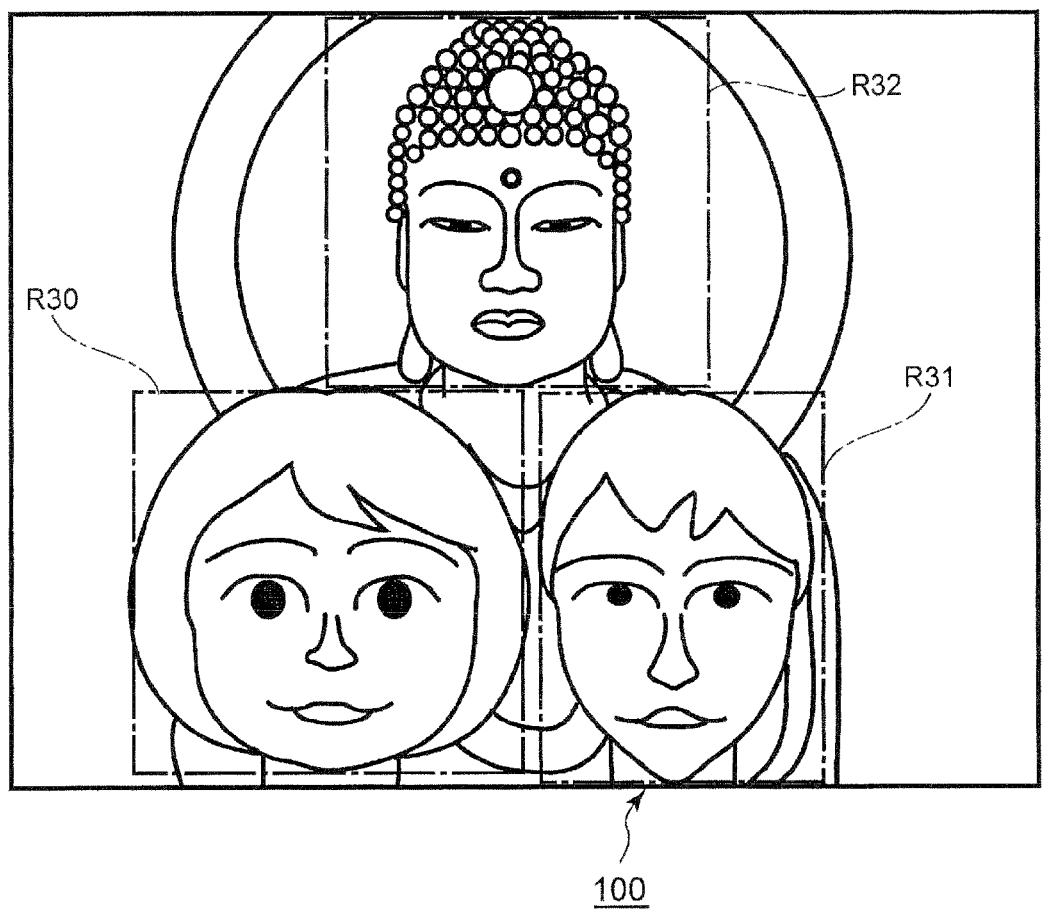
FIG. 3 is a diagram showing a live view image.
Figure 4:
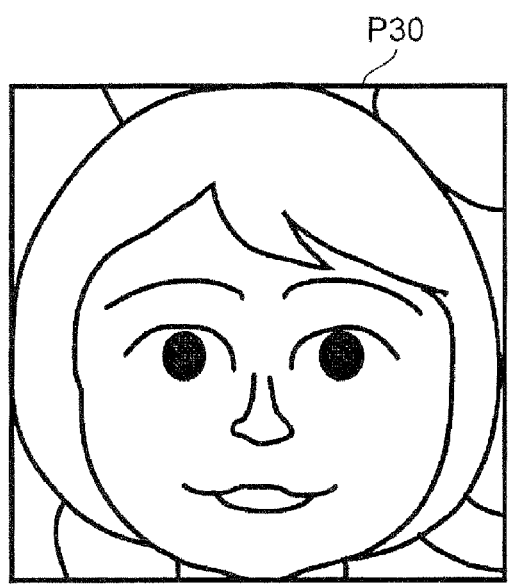
FIG. 4 is a diagram showing an image cut out from a full-size image.
Figure 4:
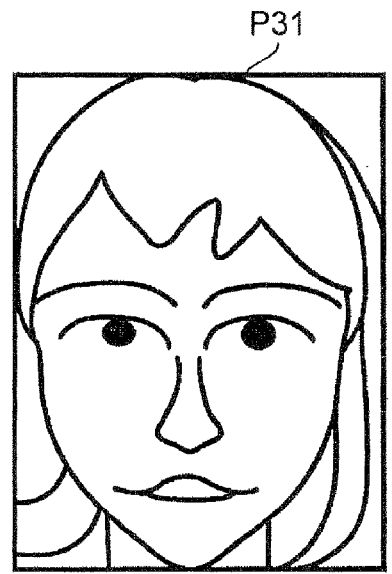
Figure 4:
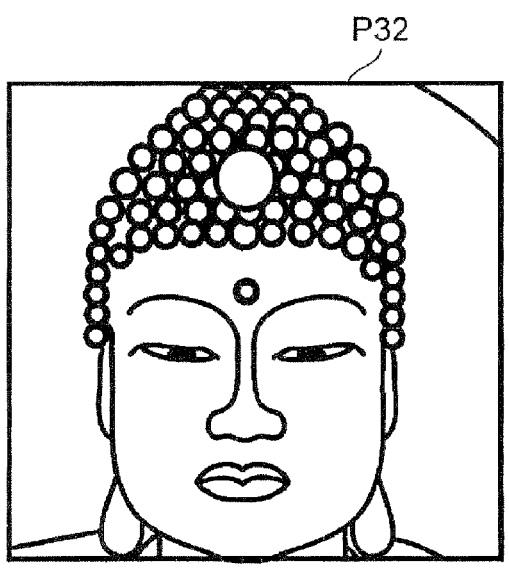

First, the face detecting unit 14 searches the live view image 100 shown in FIG. 2 for any facial image area, and as a result, searches out areas R30, R31, and R32 as shown in FIG. 3. Then, the face detecting unit 14 specifies the positions of the areas R30, R31, and R32 in the live view image. After this, the face determining unit 15 cuts out from the full-size image formed on the CMOS 11, areas P30, P31, and P32 (see FIG. 4) that correspond to the areas R30, R31, and R32 specified by the face detecting unit 14, and gives a close check to determine whether the images in the cut-out areas are truly a facial image or not.

For example, the face determining unit 15 determines that the images in the areas P30 and P31 are facial images because these images represent a human face. On the other hand, the face determining unit 15 determines, after giving a close check to the full-size image having a higher resolution, that the image in the area P32 is an image that, in an accurate level, has features that deviate from human facial features. That is, since the face detecting unit 14 detects every image area that has a possibility, even if slight, of representing a facial image as a facial image area, it may sometimes detect an image area like the area R32, which does not represent a facial image on a close look. On the other hand, the face determining unit 15 performs a high-accuracy determination using a full-size image. Therefore, the face determining unit 15 corrects the face detecting unit 14 when it detects a facial image area by mistakenly deeming it to represent a facial image, and can determine in an accurate level whether the area in the full-size image that corresponds to the detected facial image area represents a facial image or not. Hence, the face detecting unit 14 detects the area R32 in the live view image 100 and the area P32 in the full-size image corresponding to this live view image as representing a facial image, while the face determining unit 15 does not determine them so.

Figure 5:
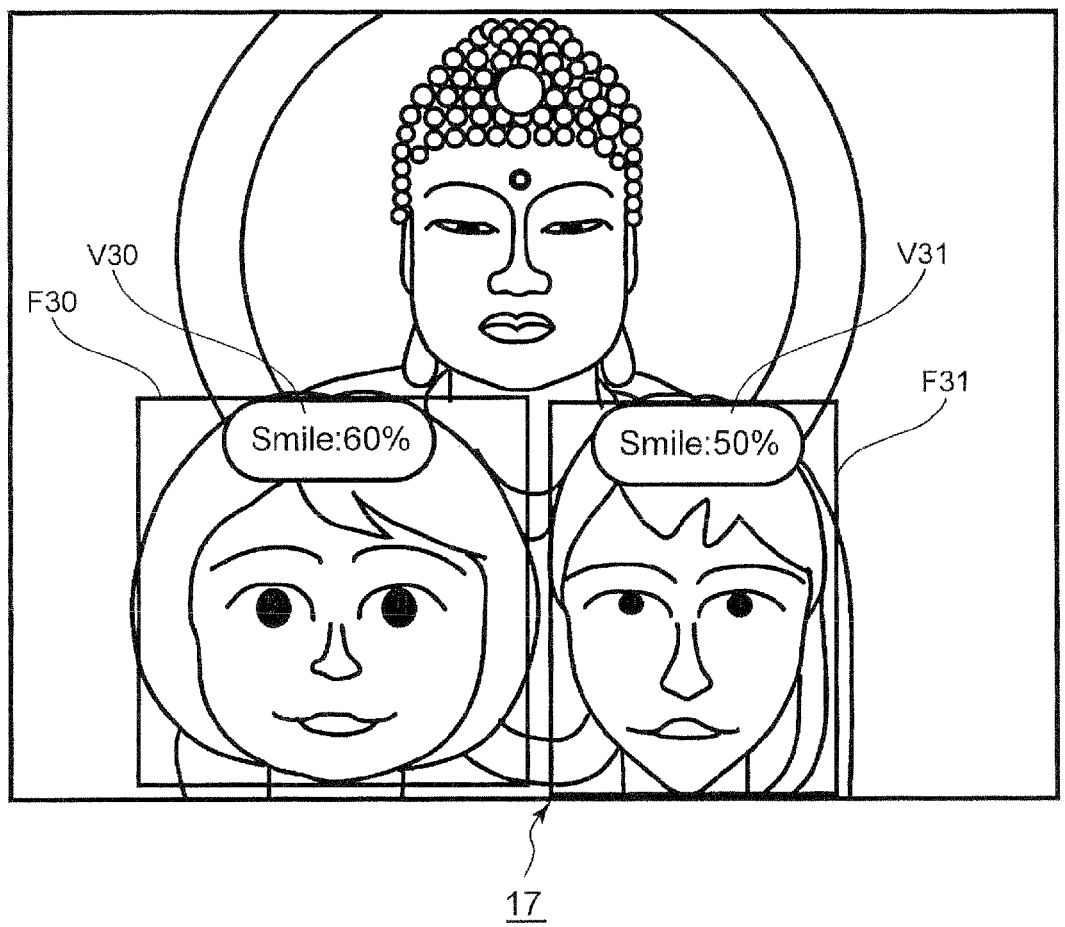
FIG. 5 is a diagram showing a live view image.

Next, the expression recognizing unit 16 performs expression evaluation on the areas P30 and P31 that are determined by the face determining unit 15 to represent a facial image, and computes an expression evaluation score. An expression evaluation score is computed based on two kinds of evaluations on each detected facial image about, for example, whether "the eyes are open" and whether "the expression is a smile", which are then expressed in values. That is, an expression evaluation score is an indicator of whether a facial expression is so "favorable" as to qualify as a subject, and takes a large value when the subject person puts on a smile. After the expression evaluation scores are computed, the digital camera 1 displays frames F30 and F31 that indicate the positions of the facial images and the expression evaluation scores V30 and V31 of the facial images on the display unit 17 (see FIG. 5). In a case where the expression evaluation scores of the facial images are higher than a predetermined threshold, the full-size image formed on the CMOS 11 is stored in the storage unit 13, which thus completes auto-shutter.

Figure 6:
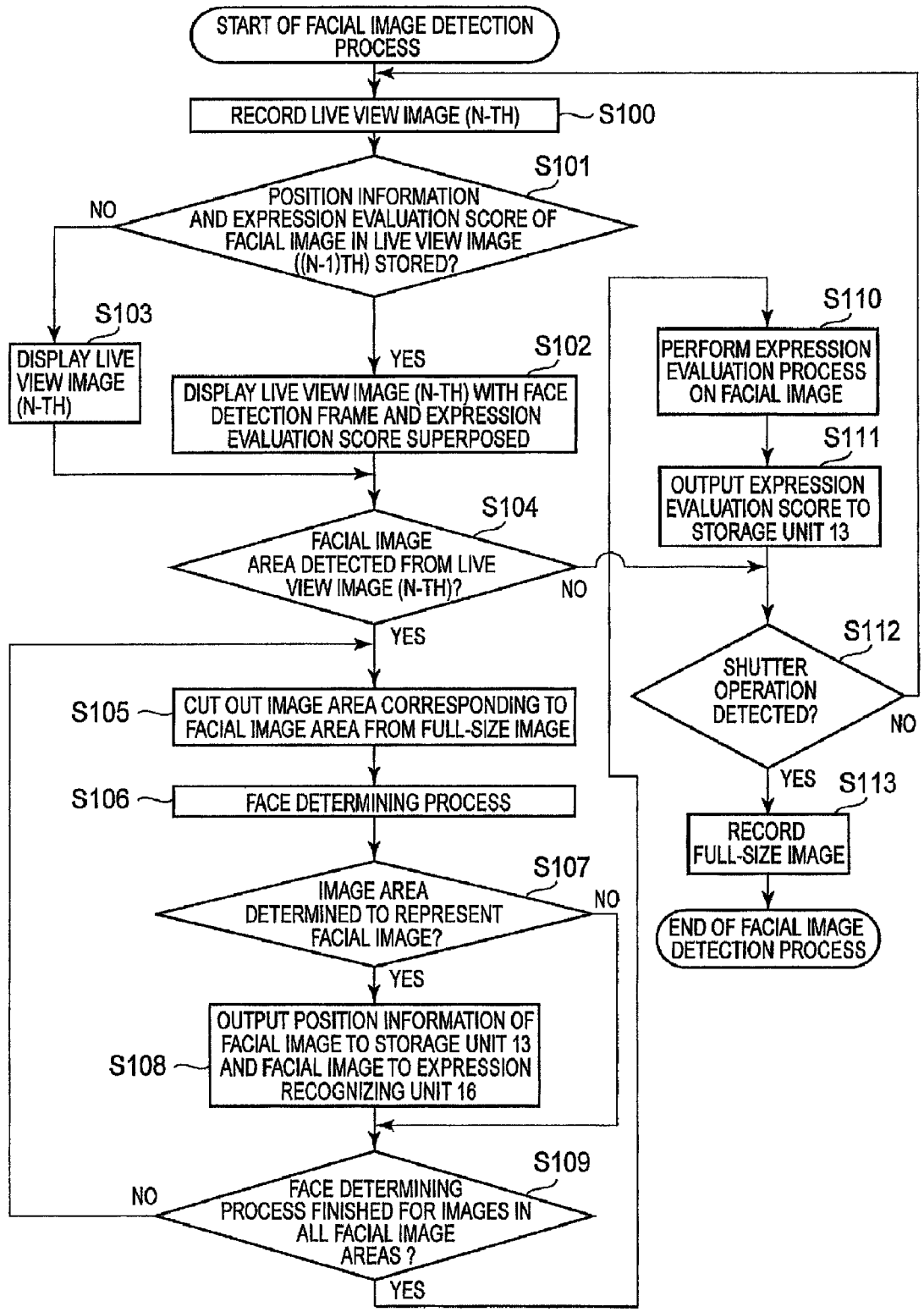
FIG. 6 is a flowchart showing the procedures of facial image detection by the digital camera.

The process described above will now be explained in detail with reference to FIG. 6. The control unit 18 reads out a program stored in the program memory 181 and starts this process in accordance with this program. First, the control unit 18 sequentially generates live view images at predetermined time intervals (e.g., thirty to sixty times per second). Specifically, the control unit 18 generates live view images by reducing the resolution of the images formed on the CMOS 11 and displays them on the display unit 17 in sequence. This process is to give the user an opportunity to think about the picture composition. The flowchart of FIG. 6 shows the processes for when an N-th live view image is generated.

First, the N-th live view image is recorded in the storage unit 13 (step S100).

At this time, if position information and expression evaluation score of any facial image that was detected from the live view image generated last, i.e., the (N−1)th live view image, are stored in the storage unit 13 (step S101; YES), the N-th live view image is displayed on the display unit 17, with the frame indicating the position of the facial image detected from the (N−1)th live view image and the expression evaluation score of the facial image superposed (step S102).

If no facial image detected from the (N−1)th live view image and hence no expression evaluation score are stored in the storage unit 13 (step S101; NO), only the N-th live view image is displayed on the display unit 17 (step S103).

Next, the face detecting unit 14 searches the N-th live view image to detect any facial image area (step S104). The detailed procedures of facial image area detection at step S104 will be described later.

In a case where a facial image area is detected from the N-th live view image (step S104; YES), the position of the facial image area is specified and an area corresponding to that facial image area is cut out from the full-size image formed on the CMOS 11 and supplied to the face determining unit 15 (step S105). In a case where no facial image area is detected from the N-th live view image (step S104; NO), it is deemed that no facial image is present in the image, and the flow goes to step S112 skipping step S105 to step S111.

The face determining unit 15 performs a face determining process of determining whether the supplied image area represents a facial image or not (step S106). The detailed procedures of the face determining process will be described later.

In a case where the face determining unit 15 determines at the face determination at step S106 that the supplied image area represents a facial image (step S107; YES), it outputs the position information of the facial image into the storage unit 13, and the facial image to the expression recognizing unit 16 (step S108). On the other hand, in a case where the face determining unit 15 determines that the supplied image area does not represent a facial image (step S107; NO), the flow skips step S108 to go to step S109.

The process from step S105 to step S109 is performed repetitively for all facial image areas that are detected.

The control unit 18 determines whether the face determining process has been done for all facial image areas (step S109), and when determined that the face determining process has been done for all facial image areas (step S109; YES), advances to step S110.

The facial image output at step S108 is subjected to expression evaluation process (step S110) by the expression recognizing unit 16, which computes an expression evaluation score and outputs it into the storage unit 13 (step S111). In a case where no facial image has been output at step S108, step S110 and step S111 do not take place.

Expression evaluation process is a process of computing an expression evaluation score that indicates whether the face included in a facial image is similar or not to a predetermined expression, which, in the present embodiment, is a smile. The higher the degree of expression of a person's smile is in a facial image, the higher the expression evaluation score to be given is. An expression evaluation score may be computed by a method of determining to which an evaluation-target facial image is more similar, a reference image that represents a smile or a reference image that represents an expressionless face. This method of computing an expression evaluation score is specifically described in Patent Literature 2 identified above.

The user checks the expression evaluation score displayed on the display unit 17 and determines whether or not to give a shutter operation. Then, the user operates the shutter (step S112; YES), and upon detecting this, the control unit 18 records the full-size image, which has been captured at an image capturing condition for recordation and formed on the CMOS 11, in the external memory 19 (step S113), and completes image capturing.

In a case where the user does not give a shutter operation (step S112; NO), in which case no shutter operation is detected, the control unit 18 returns the flow to step S100 to repeat the same process for the (N+1)th live view image.

Next, the detailed procedures of the facial image area detection at step S104 will be explained. In the facial image area detecting process, the face detecting unit 14 cuts out an area from a search-target live view image, compares the cut-out partial image with a reference facial image, and computes the degree of similarity between the partial image and the reference facial image. Then, in a case where the computed degree of similarity is higher than a predetermined threshold (first threshold), the face detecting unit 14 detects the partial image as a facial image area. Note that the reference facial image is a composite of images of a plurality of human faces, representing average facial features in monochrome. The reference facial image is preliminarily generated and stored in the storage unit 13.

Figure 7:
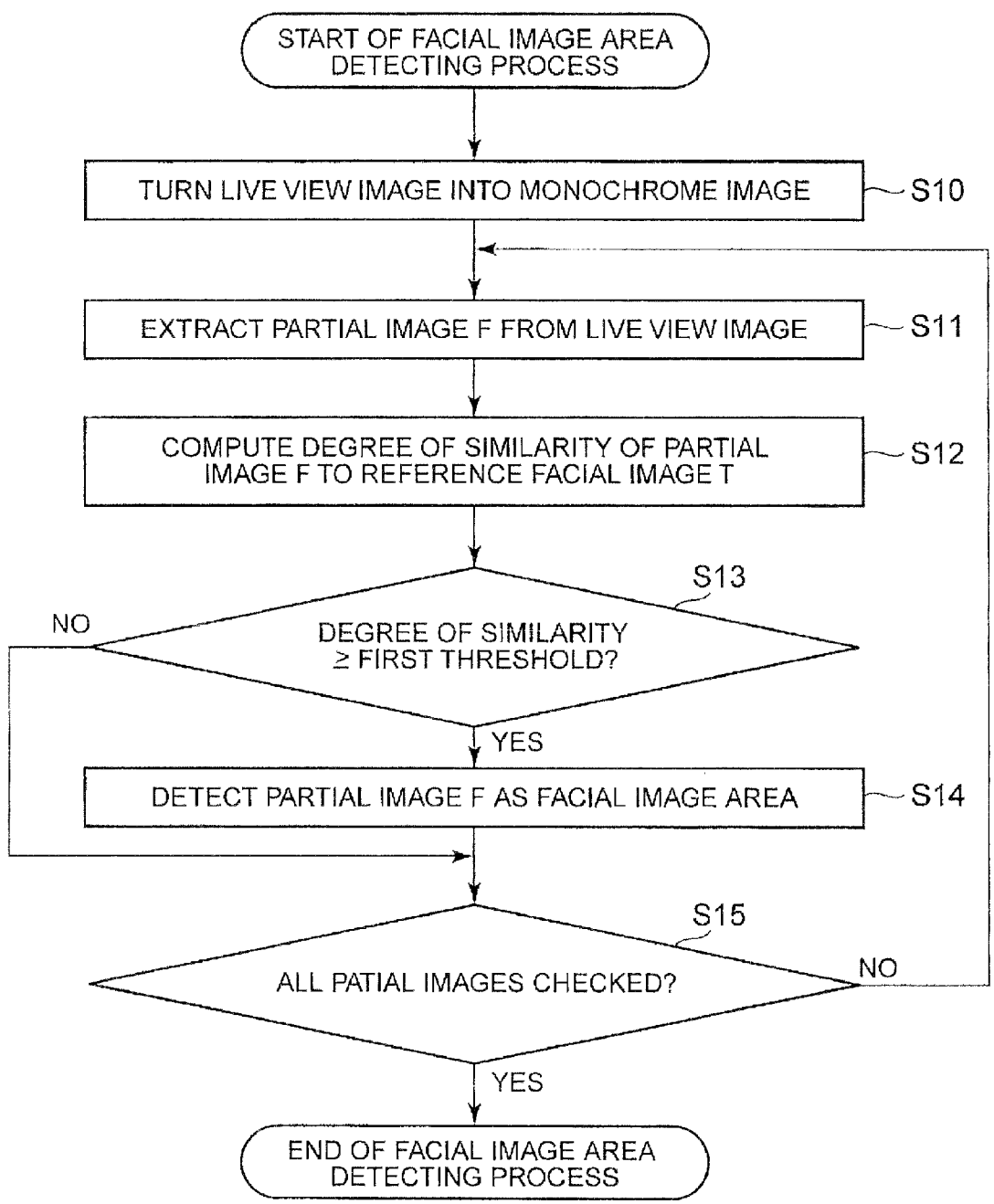
FIG. 7 is a flowchart showing the procedures of facial image area detection by the digital camera.
Figure 8:
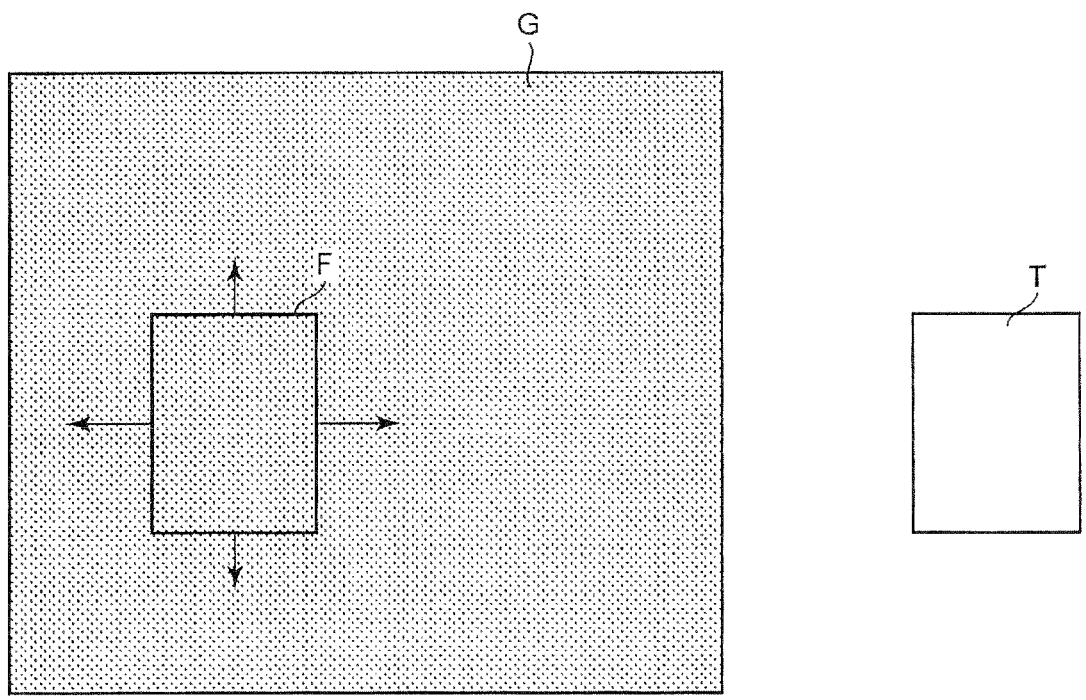
FIG. 8 is a diagram explaining a partial image cut out from alive view image on facial image area detection.

FIG. 7 is a flowchart showing the procedures of the facial image area detecting process, and FIG. 8 is a diagram explaining a partial image to be cut out from a live view image in the process of the facial image area detection. The following explanation will be given with reference to FIG. 7 and FIG. 8.

Since the reference facial image is a monochrome image as described above, the face detecting unit 14 first turns the search-target live view image into a monochrome image (step S10).

Next, as shown in FIG. 8, the face detecting unit 14 cuts out a partial image F, which is the same size as the reference facial image T, from the live view image G turned into a monochrome at step S10 (step S11).

Then, the face detecting unit 14 compares the reference facial image T and the partial image F as to their luminance at the pixel level, and computes the degree of similarity between the reference facial image T and the partial image F (step S12). Computation of a degree of similarity is among common knowledge of those skilled in the art and hence will not be detailed here.

In a case where the obtained degree of similarity is equal to or higher than a predetermined threshold (first threshold) (step S13; YES), the face detecting unit 14 detects the partial image F as a facial image area (step S14).

Next, the face detecting unit 14 either shifts the partial image F by one pixel vertically or horizontally or changes the size of the reference facial image T, and repeats the process from step S11 to step S14 (step S15; NO).

When all possible partial areas F of the live view image have been checked (step S15; YES), the face detecting unit 14 ends the facial image area detection.

Next, the detailed procedures of the face determining process at step S106 will be explained. The face determining process is a process of determining whether an area in a full-size image that corresponds to the facial image area detected in the facial image area detecting process (this area in a full-size image will hereinafter be referred to as determination area) represents a facial image or not. For this purpose, in the face determining process, the face determining unit 15 checks the degree of similarity between the image in the determination area and a full-size reference facial image. Note that the full-size reference facial image is a higher-resolution version of the reference facial image used in the facial image area detecting process, increased in the pixel count to match the full-size image.

Figure 9:
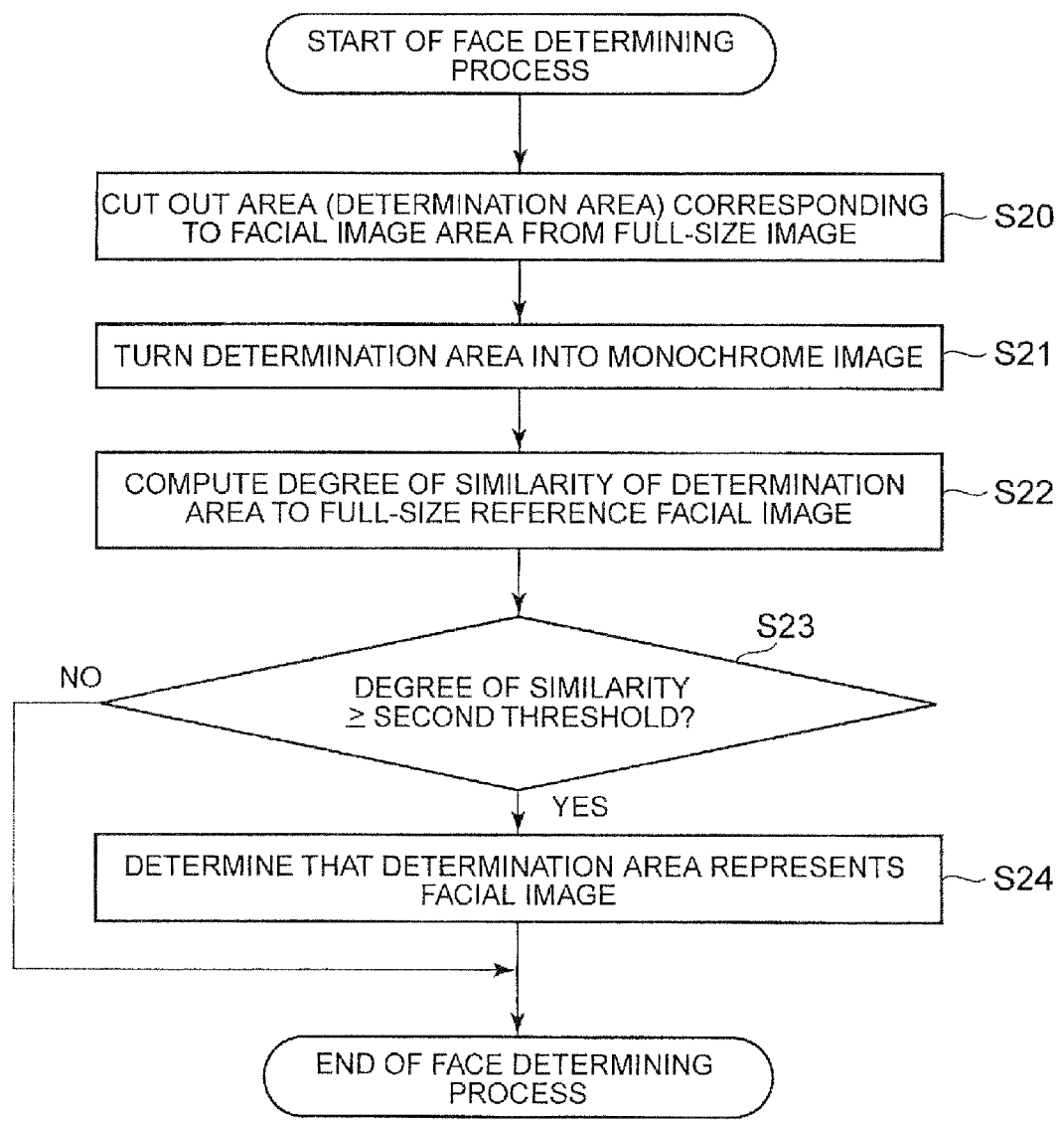
FIG. 9 is a flowchart showing the procedures of a face determining process by the digital camera.

FIG. 9 is a flowchart showing the procedures of the face determining process. The following explanation will be given with reference to FIG. 9.

First, the face determining unit 15 cuts out a determination area from the full-size image formed on the CMOS 11 (step S20), and turns the image into a monochrome image (step S21).

Next, the face determining unit 15 compares the full-size reference facial image and the image in the determination area as to their luminance at the pixel level, and computes the degree of similarity between the full-size reference facial image and the image in the determination area (step S22).

In a case where the obtained degree of similarity is equal to or higher than a predetermined threshold (second threshold) (step S23:YES), the face determining unit 15 determines that the determination area represents a facial image (step S24). In a case where the degree of similarity is lower than the predetermined threshold (second threshold) (step S23; NO), the face determining unit 15 determines that the determination area does not represent a facial image, and ends the face determining process.

As described above, the digital camera 1 searches a live view image in order to detect any facial image area, and in a ease where a facial image area is detected, performs determination of whether represented is a facial image or not and computation of an expression evaluation score on an area in the full size image that corresponds to the detected facial image area. This means that in a case where no facial image area is detected in a search across a live view image, the determining process can be cut short upon finding of that search result, leading to shortening of the process time. In a case where any facial image area is detected, a higher-accuracy face determining process can be performed on the detected image area so that it can be determined in an accurate level whether a facial image is present or absent in a picked-up image. Furthermore, an image that is determined to be a facial image in the face determining process can be subjected to expression evaluation process so that it can be determined in an accurate level whether the expression of the face included in the so-determined facial image is a "favorable expression" in a common sense.

[Modifications]

Figure 10:
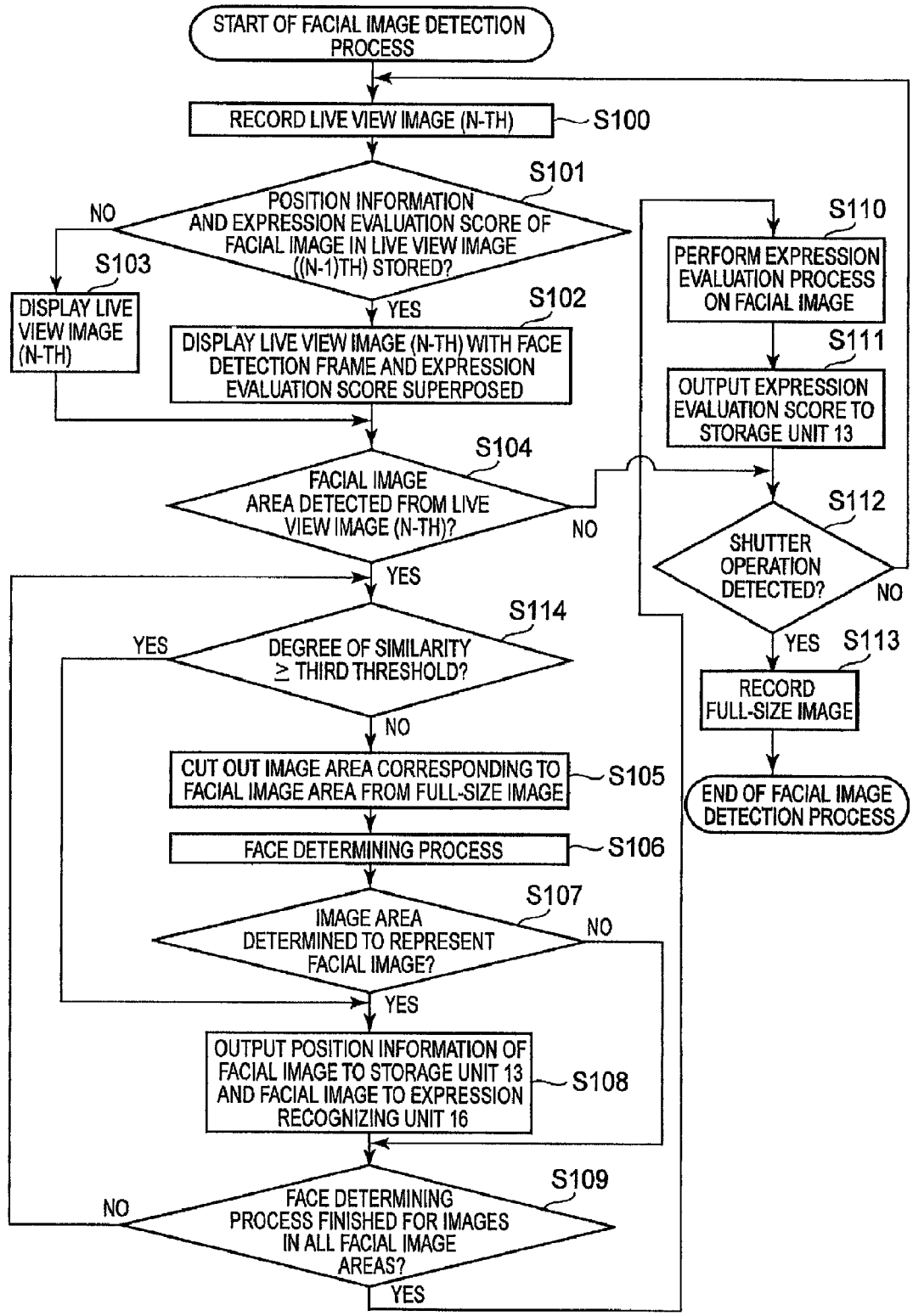
FIG. 10 is a flowchart showing a modified example of the procedures of facial image detection.

The control flow shown in FIG. 6 may be modified as shown in FIG. 10. That is, step S114 may be added between step S104 and step S105 so that in a case where it is determined at step S114 that a degree of similarity between the reference facial image T and a partial image F is higher than a third threshold that is larger than the first threshold (step S114;YES), the process from step S105 to step S107 may be skipped. In this way, in a case where the degree of similarity between the reference facial image T and the partial image F is higher than the third threshold, it can be before the flow advances to the face determining process that it is possible to give a determination that a face is present in the facial image area detected in the facial image area detecting process, leading to a further shortening of the process time. Note that the third threshold is a value larger than the first threshold, which, when surpassed, determines even an area in a live view image as being sufficiently reliable as to it representing a facial image.

Figure 11:
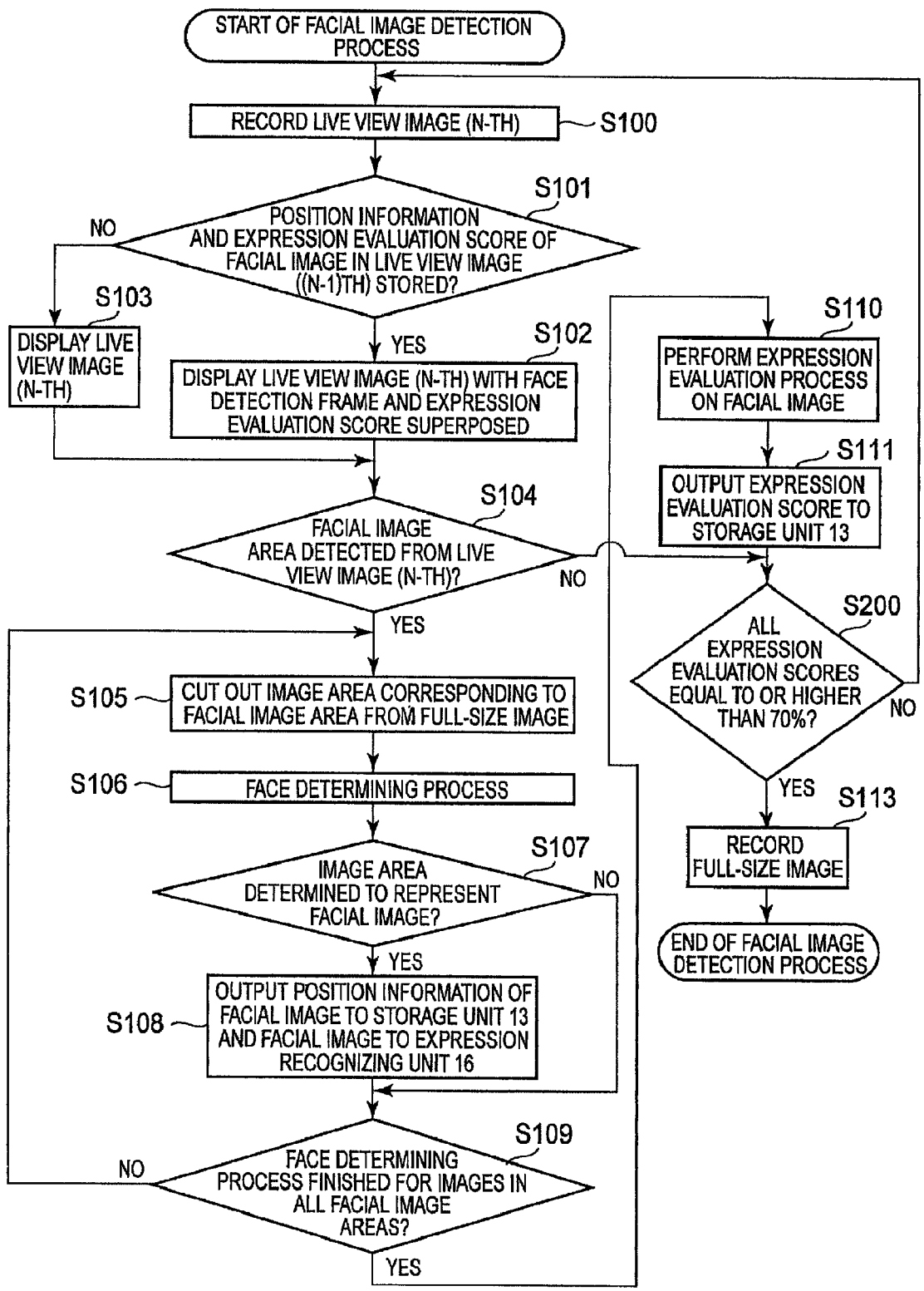
FIG. 11 is a flowchart showing a modified example of the procedures of facial image detection.

Further, in the control flow shown in FIG. 6, the full-size image on the CMOS 11 is stored in the external memory 19 in response to a shutter operation of the user (step S112). Alternatively, step S200 may be placed instead of step S112 as shown in FIG. 11 so that the expression recognizing unit 16 may determine whether all expression evaluation scores are higher than 70% or not, and in a case where determined so, the control unit 18 may automatically record the full-size image on the CMOS 11 in the external memory 19. In this way, it is possible to automatically capture an image at the instant the subject shows a smile without waiting for a shutter operation to be given by the user.

The requirement that must be met for a full-size image on the CMOS 11 to be automatically recorded in the external memory 19 is not limited to that "all expression evaluation scores are higher than 70%". It may be that "at least one expression evaluation score is higher than 70%" or the threshold may be any other than "70%".

The facial image area detecting process is performed every time a live view image is output by the CMOS 11, which outputs thirty to sixty live view image frames per second, while it is possible to consider that the position of a facial image area does not change greatly in a short time. Further, it is likely that an area that has been determined not to represent a facial image in the face determining process is again detected as a facial image area in the facial image area detecting process for the next frame. In this case, however, since this area has been determined, in the process on the previous frame, not to represent a facial image by the face determining process that is more accurate than the facial image area detecting process, this facial image area, which is detected at all in the process on the next frame, will be highly probably determined by the face determining process not to represent a facial image. Hence, a facial image area that has once been determined not to represent a facial image in the process for the nearest previous one or more frame(s) performed in sequence may be deemed in a live view image not to be a facial image area, so as to be excluded from those areas that are the target of the facial image area detecting process or the face determining process.

Figure 12:
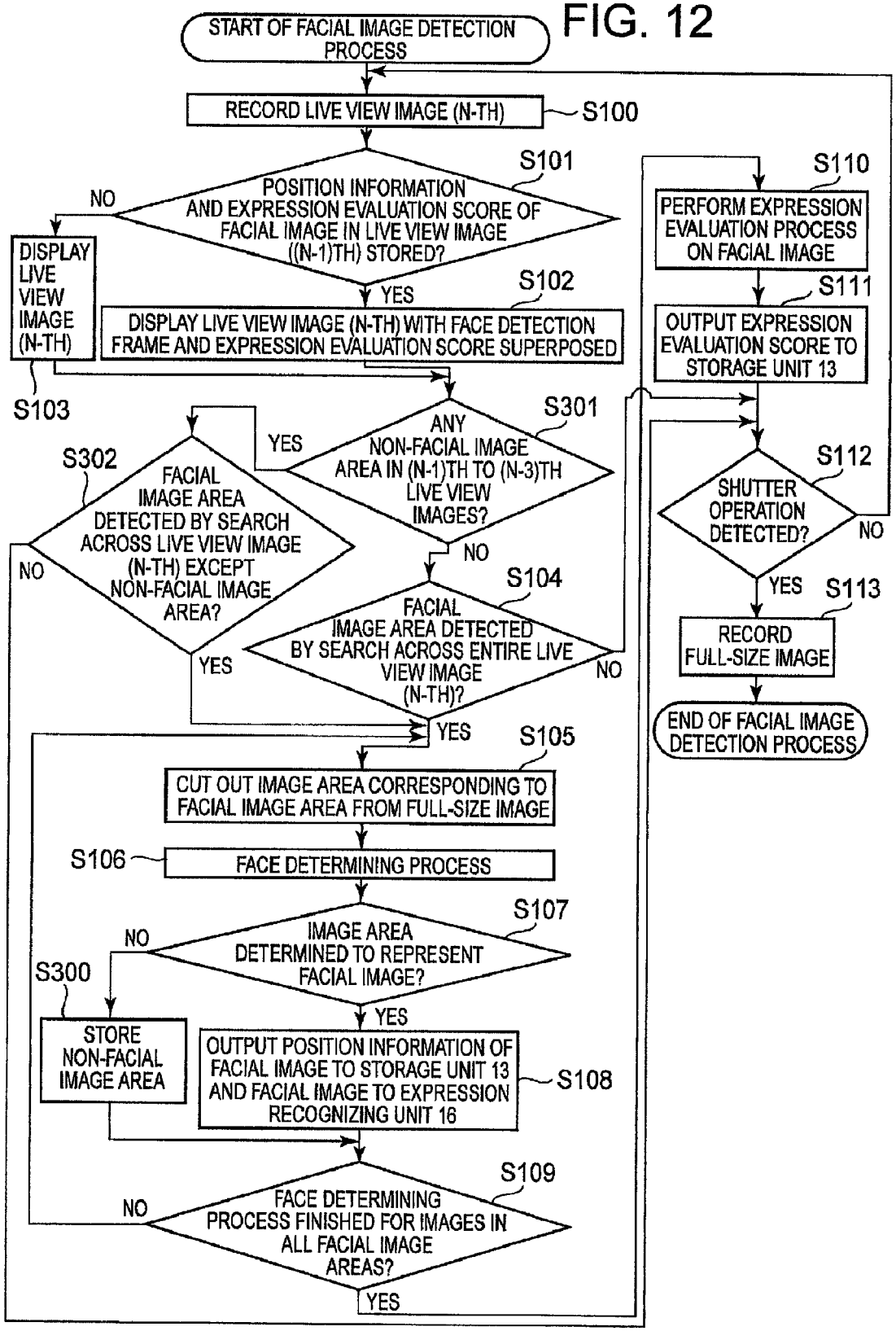
FIG. 12 is a flow/chart showing a modified example of the procedures of facial image detection.

Specifically, in a case where it is determined in the face determining process in the flow shown in FIG. 12 that a determination area in a full-size image that corresponds to a facial image area does not represent a facial image (step S107; NO), the control unit 18 stores the position information of the determination area in the storage unit 13 as information of a non-facial image area (step S300). The control unit 18 determines whether or not there exists an area corresponding to such anon-facial image area in the nearest previous three live view age frames ((N-1)th to (N-3)th live view images) (step S301). In a case where it is determined that such an area exists (step S301; YES), the control unit 18 deems that the area in the N-th live view image is not a facial image, so that a search may be conducted in the facial image area detecting process while this area is excluded from the search target (step S302).

Figure 13:
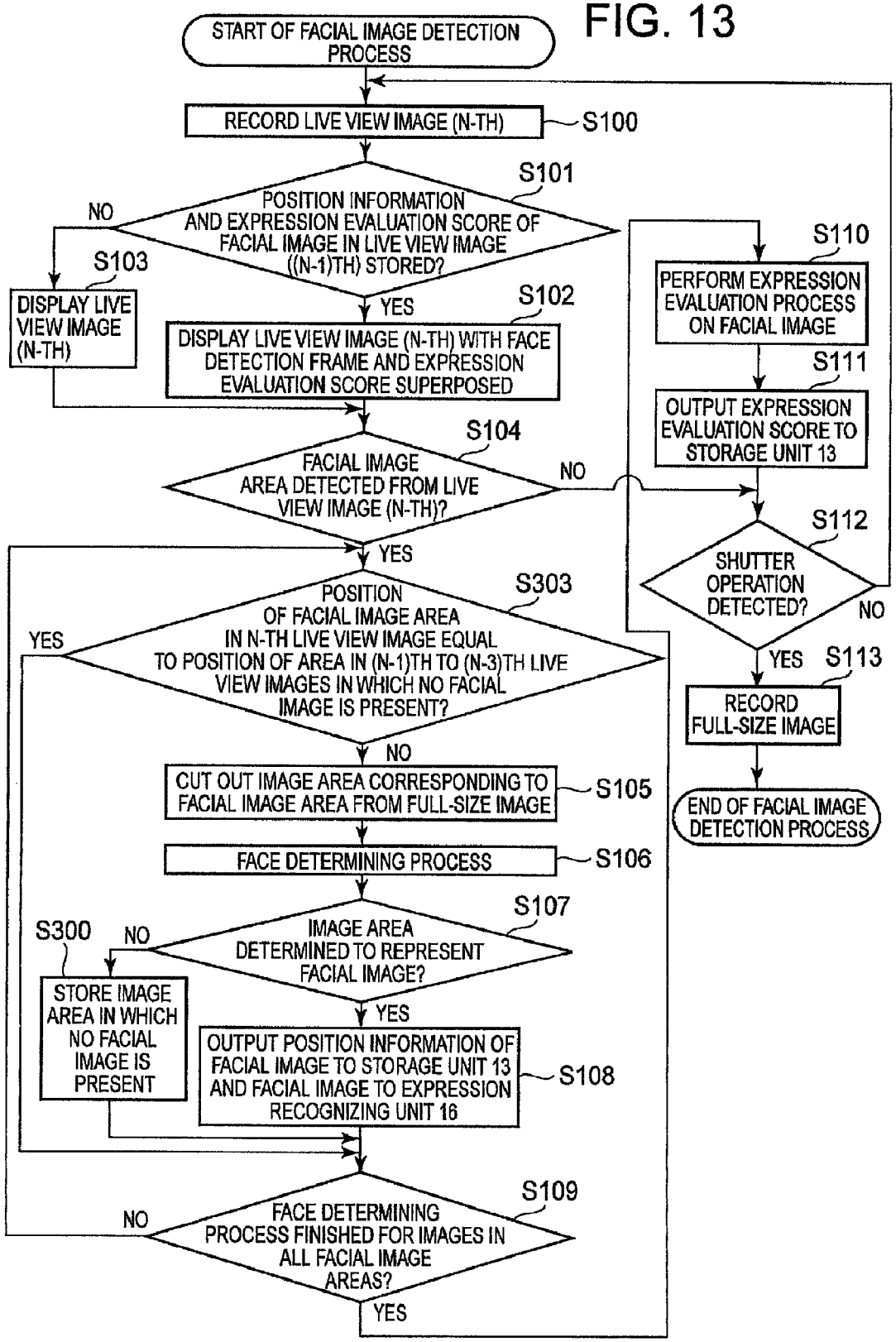
FIG. 13 is a flowchart showing a modified example of the procedures of facial image detection.

Alternatively, as shown in FIG. 13, in a case where the position of a facial image area detected from an N-th live view image is substantially equal to the position of a non-facial image area in the nearest previous three live view image frames ((N-1)th to (N-3)th live view images) (step S303; YES), step S105 to step S108 of FIG. 13 may be skipped so that the facial image area detected from the N-th live view image may be deemed not to represent a facial image and excluded from the target of the face determining process. In contrast, in a case where the position of a facial image area detected from the N-th live view image is substantially equal to the position of a facial image in the nearest previous three live view image frames ((N-1)th to (N-3)th live view images), the facial image area detected from the N-th live view image may be deemed to represent a facial image and excluded from the target of the face determining process, i.e., the facial image area may be deemed to represent a facial image without being subjected to the face determining process.

By performing the process of FIG. 12 or FIG. 13, it is possible to accurately determine presence or absence of an image area corresponding to a subject (here, a facial image), and at the same time, to further shorten the time taken for the determination.

In any of the embodiment and the modifications described above, the degree of similarity between a partial image cut out from a live view image and a reference facial image is computed, and in a case where the degree of similarity is higher than a predetermined threshold (first threshold), the partial image is detected as a facial image area. There, the first threshold should be a value that makes even an area that has a slight possibility of representing a facial image be detected as a facial image area. That is, the facial image area detecting process is not for detecting an area that represents a facial image, but for limiting the areas that are to be subjected to the face determining process that can determine, in an accurate level, whether a facial image is present or not.

As can be understood, before the face determining process that is accurate using a full-size image is performed, a live view image is searched for an area (facial image area) that has a possibility, even if slight, of representing a facial image, such that the face determining process is performed only in a ease where an area that has a possibility, even if slight, of representing a facial image is detected. Hence, it is possible to shorten the process time in a case where there is no possibility that a facial image area is present in a live view image, while it is possible to perform a determination of presence or absence of a facial image on a detected facial image area, with the face determining process of high accuracy.

Further, expression evaluation process is also performed on the full-size image of the area that has been determined to represent a face in the face determining process. Hence, high-accuracy expression evaluation process can be performed.

In any of the embodiment and the modifications described above, the facial image area detecting process and the face determining process employ the method of computing a degree of similarity to a reference facial image. However, these processes may employ any other method, or may employ different methods from each other respectively. For example, the facial image area detecting process may detect a facial image area by skin color detection, while the face determining process may determine whether a facial image is represented or not by detecting a feature point such as eye, mouth, etc. In any case, the face determining process should be able to achieve a more accurate result of whether an area represents a facial image or not than that achieved by the facial image area detecting process.

In any of the embodiment and the modifications described above, what is detected from an image is a human face, but the present invention may be implemented for any other subject than a face.

According the embodiment and the modifications described above, it is possible to accurately determine presence or absence of an image area that corresponds to a subject, and at the same time to reduce the time take for the determination.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2008-231203 filed on Sep. 9, 2008 and including specification, claims, drawings and summary. The disclosure of the above Japanese Patent Application is incorporated herein by reference in its entirety.

What is claimed is:

1. An image capturing apparatus, comprising:
    an image capture device that captures an image by an image capture process;
    an image generator that generates a first image, which is generated by reducing a resolution of the image captured by the image capture device;
    an image searcher that searches for an image area corresponding to a subject from the first image generated by the image generator;
    a first determiner that determines whether or not the image area corresponding to the subject is detected by a search of the image searcher;
    a first controller that deems that an image area corresponding to the subject is not present in the image captured by the image capture device in a case in which it is determined by the first determiner that the image area corresponding to the subject is not detected, and specifies a location of the detected image area in a case in which it is determined that the image area is detected;

a second determiner that determines whether or not the image area corresponding to the location specified by control of the first controller in the image captured by the image capture device is an image area corresponding to the subject;

a second controller that deems that the image area corresponding to the subject is present in the image captured by the image capture device in a case of a positive determination by the second determiner;

a first evaluation score computer that computes a degree of similarity between an image area which is a search target of the image searcher and the image area corresponding to the subject in the first image as an evaluation score;

a second evaluation score computer that computes a degree of similarity between the image area corresponding to the specified location and the image area corresponding to the subject in the image captured by the image capture device as an evaluation score; and a third determiner that determines whether or not the evaluation score computed by the first evaluation score computer is equal to or higher than a third threshold value that is larger than a first threshold value in a case in which it is determined that the image area corresponding to the subject is detected as a result of a determination by the first determiner, wherein the first determiner determines whether or not the image area corresponding to the subject is detected, based on whether or not an image area where the evaluation score computed by the first evaluation score computer from the first image is equal to or higher than the first threshold value is detected, and wherein the second determiner determines whether or not the image area corresponding to the specified location is the image area corresponding to the subject, based on whether or not the evaluation score computed by the second evaluation score computer is equal to or higher than a second threshold value, and deems that the image area corresponding to the subject is present in the image captured by the image capture device in a case of a positive determination by the third determiner before a determination by the second determiner.

2. The image capturing apparatus according to claim 1, wherein the first evaluation score computer and the second evaluation score computer both compute evaluation scores by a same method.

3. The image capturing apparatus according to claim 2, wherein the first threshold value is smaller than the second threshold value.

4. The image capturing apparatus according to claim 2, further comprising a reference image storer that stores the image area corresponding to the subject as a reference image, wherein the first evaluation score computer and the second evaluation score computer compute the degree of similarity between the reference image stored in the reference image storer and a designated image area and the image area corresponding to the specified location, as the evaluation score.

5. The image capturing apparatus according to claim 1, wherein the first evaluation score computer and the second evaluation score computer each compute the evaluation score by a different method.

6. The image capturing apparatus according to claim 1, wherein the image capture device sequentially captures images by sequentially performing the image capture process, and the image generator sequentially generates the first image from these sequentially captured images, and wherein the image capturing apparatus further comprises a third controller that deems that the image area of the location specified by control of the first controller is not the image area corresponding to the subject in a case of a negative determination by the second determiner.

7. The image capturing apparatus according to claim 6, further comprising a fourth controller that controls exclusion from the search target by the image searcher of the image area of the specified location in the first image sequentially generated after control by the third controller.

8. The image capturing apparatus according to claim 6, further comprising:

a fourth determiner that determines whether or not the location specified by control of the first controller and a location specified by control of the third controller are substantially the same after control by the third controller; and a fifth controller that deems that the image area corresponding to the location specified by control of the first controller of the image captured by the image capture device is not the image area corresponding to the subject in a case in which the location specified by control of the first controller and the location specified by control of the third controller are determined to be substantially the same by the fourth determiner before a determination by the second controller.

9. The image capturing apparatus according to claim 1, wherein:

the image capture device sequentially captures images by sequentially performing the image capturing process, and the image generator sequentially generates the first image from these sequentially captured images, and the image capturing apparatus comprises:

a sixth controller that specifies a location of an image area in the image captured by the image capture device, which corresponds to the location specified by control of the first controller, in a case of a positive determination by the second determiner;

a fifth determiner that determines whether or not the location specified by control of the first controller in the first image sequentially generated after control by the sixth controller and the location specified by control of the sixth controller are substantially the same; and a seventh controller that deems that the image area corresponding to the location specified by control of the first controller of the image captured by the image capture device is the image area corresponding to the subject in a case in which the location specified by control of the first controller in the first image sequentially generated after control by the sixth controller and the location specified by control of the sixth controller are determined to be substantially the same by the fifth determiner before determination by the second determiner.

10. The image capturing apparatus according to claim 1, wherein the image area corresponding to the subject is an area that includes an image of a human face, and wherein the image capturing apparatus further comprises an expression evaluation score computer that computes, as an expression evaluation score, a degree of similarity between a facial expression included in the image area that is deemed to be present by control of the second controller and a predetermined facial expression.

11. The image capturing apparatus according to claim 10, further comprising an expression evaluation score notifier that notifies a user of the expression evaluation score computed by the expression evaluation score computer.

12. The image capturing apparatus according to claim 10, further comprising:
a sixth determiner that determines whether or not the expression evaluation score computed by the expression evaluation score computer is equal to or higher than a predetermined threshold value; and
a recorder that records the image captured by the image capture device that includes the facial expression in a case in which it is determined by the sixth determiner that the expression evaluation score is equal to or higher than the predetermined threshold.

13. A method of determining presence or absence of an image area, comprising:
an image generating step of generating a first image by reducing a resolution of an image captured by an image capture device;
a searching step of searching for an image area corresponding to a subject from the first image generated by the image generating step;
a first determining step of determining whether or not the image area corresponding to the subject is detected by a search in the searching step;
a first controlling step of deeming that an image area corresponding to the subject is not present in the image captured by the image capture device in a case in which it is determined by the first determining step that the image area corresponding to the subject is not detected, and specifying a location of the detected image area in a case in which it is determined that the image area is detected;
a second determining step of determining whether or not the image area corresponding to the location specified by control of the first controlling step in the image captured by the image capture device is an image area corresponding to the subject;
a second controlling step of deeming that the image area corresponding to the subject is present in the image captured by the image capture device in a case of a positive determination by the second determining step;
a first evaluation score computing step of computing a degree of similarity between an image area which is a search target of the image searcher and the image area corresponding to the subject in the first image as an evaluation score;
a second evaluation score computing step of computing a degree of similarity between the image area corresponding to the specified location and the image area corresponding to the subject in the image captured by the image capture device as an evaluation score; and
a third determining step of determining whether or not the evaluation score computed by the first evaluation score computing step is equal to or higher than a third threshold value that is larger than a first threshold value in a case in which it is determined that the image area corresponding to the subject is detected as a result of a determination by the first determining step,
wherein the first determining step determines whether or not the image area corresponding to the subject is detected, based on whether or not an image area where the evaluation score computed by the first evaluation score computer from the first image is equal to or higher than the first threshold value is detected, and
wherein the second determining step determines whether or not the image area corresponding to the specified location is the image area corresponding to the subject, based on whether or not the evaluation score computed by the second evaluation score computing step is equal to or higher than a second threshold value, and deems that the image area corresponding to the subject is present in the image captured by the image capture device in a case of a positive determination by the third determining step before a determination by the second determining step.

14. A non-transitory computer readable recording medium having a program stored thereon for causing a computer in an image capturing apparatus including a detector that detects an image area and a determiner that determines an image area to function as:
an image generator that generates a first image, which is generated by reducing a resolution of a captured image;
an image searcher that searches for an image area corresponding to a subject from the first image generated by the image generator, by conducting a detection process for the image area corresponding to the subject via the detector;
a first determiner that determines whether or not the detector detects the image area corresponding to the subject by a search of the image searcher;
a first controller that deems that an image area corresponding to the subject is not present in the captured image in a case where determined by the first determiner that the image area corresponding to the subject is not detected, and specifies a location of the detected image area in a case where determined that the image area is detected;
a second determiner that determines whether or not the image area corresponding to the location specified by control of the first controller in the captured image is an image area corresponding to the subject, by conducting a determination process for the image area of the specified location via the determiner;
a second controller that deems that the image area corresponding to the subject is present in the captured image in a case of a positive determination by the second determiner;
a first evaluation score computer that computes a degree of similarity between an image area which is a search target of the image searcher and the image area corresponding to the subject in the first image as an evaluation score;
a second evaluation score computer that computes a degree of similarity between the image area corresponding to the specified location and the image area corresponding to the subject in the captured image as an evaluation score; and
a third determiner that determines whether or not the evaluation score computed by the first evaluation score computer is equal to or higher than a third threshold value that is larger than a first threshold value in a case where determined that the image area corresponding to the subject is detected as a result of a determination by the first determiner,
wherein the first determiner determines whether or not the image area corresponding to the subject is detected, based on whether or not an image area where the evaluation score computed by the first evaluation score computer from the first image is equal to or higher than the first threshold value is detected, and
wherein the second determiner determines whether or not the image area corresponding to the specified location is the image area corresponding to the subject, based on whether or not the evaluation score computed by the second evaluation score computer is equal to or higher than a second threshold value, and deems that the image area corresponding to the subject is present in the captured image in a case of a positive determination by the third determiner before a determination by the second determiner.

* * * * *